US005713302A

United States Patent [19]
Walter

[11] Patent Number: 5,713,302
[45] Date of Patent: Feb. 3, 1998

[54] PET WASTE CONTAINMENT SYSTEM

[75] Inventor: Glen V. Walter, Middleton, Mass.

[73] Assignee: DESIGNPOINT Industrial Design Studio, Inc., Boston, Mass.

[21] Appl. No.: 456,050

[22] Filed: May 31, 1995

Related U.S. Application Data

[63] Continuation-in-part of Ser. No. 34,963, Feb. 2, 1995.

[51] Int. Cl.$^6$ .............................................. A01K 1/00
[52] U.S. Cl. ....................................... 119/165; 119/482
[58] Field of Search ............................. 119/165, 170, 119/496, 497, 482

[56] References Cited

U.S. PATENT DOCUMENTS

| | | | |
|---|---|---|---|
| D. 250,051 | 10/1978 | Spinks | D30/99 |
| D. 327,143 | 6/1992 | Dickinson | 119/482 X |
| 3,147,736 | 9/1964 | Daniel | 119/482 |
| 3,308,789 | 3/1967 | Artig | 119/482 |
| 3,797,461 | 3/1974 | Breeden | 119/482 |
| 3,885,523 | 5/1975 | Coleman | 119/165 |
| 5,092,277 | 3/1992 | Baillie et al. | 119/165 |
| 5,195,464 | 3/1993 | Mutter | 119/165 |
| 5,218,930 | 6/1993 | Casmira | 119/165 |
| 5,220,886 | 6/1993 | Hyde | 119/165 |
| 5,259,340 | 11/1993 | Arbogast | 119/166 |
| 5,329,878 | 7/1994 | McCauley | 119/165 |
| 5,329,879 | 7/1994 | Walton | 119/166 |
| 5,359,960 | 11/1994 | Yananton | 119/165 |
| 5,361,725 | 11/1994 | Baillie et al. | 119/165 |
| 5,394,835 | 3/1995 | Gatta | 119/170 |
| 5,448,965 | 9/1995 | McClure | 119/482 |

OTHER PUBLICATIONS

Barreto, A.F. and D.R. Paxman, Federal Trademark Reg. No. 1,631,630, For: Pet Shelters, Class 20, 15 Jan. 1991.
Dogloo, "How Does It Feel . . . " (Print Advertisement) Pet Business, Feb. 1995.
Doskocil, "Buying A Home Just Got Easier . . . " (Print Advertisement) Pet Business, Feb. 1995.
Igloo Dog Homes, "Igloo Dog Homes" (Print Advertisement) See: Trademark File History, U.S.S.N. 73/819,087.

Primary Examiner—Gene Mancene
Assistant Examiner—Yvonne R. Abbott
Attorney, Agent, or Firm—Lahive & Cockfield, LLP

[57] ABSTRACT

A pet waste containment system, or litter box, that is easily accessed by animals of all ages, and that provides for improved litter containment, maintenance and odor control is disclosed. The waste containment system includes a base, including a litter container, that is accessed by an inclined member such as a ramp or steps. The inclined member may include at least one undulation or litter collecting elements, and at least the litter container is preferably covered.

25 Claims, 9 Drawing Sheets

PET WASTE CONTAINMENT SYSTEM

REFERENCE TO RELATED APPLICATIONS

This application is a continuation-in-part of U.S. Ser. No. 29/034,963 filed Feb. 2, 1995, entitled "Domed Cat Litter Box", the contents of which are incorporated herein by reference.

BACKGROUND OF THE INVENTION

This invention relates to waste containment systems, and more particularly to waste containment systems, commonly called litter boxes, for domestic animals such as cats.

Litter boxes commonly consist solely of a tray or box-like portion to contain waste-absorbent material, and are generally regarded by pet owners as unsightly or unsanitary. They are often malodorous, and the waste absorbent material, or litter, adheres to the animal's feet and fur, so that when the animal exits the litter box, it tracks litter throughout the pet owner's home. In litter boxes without lids, the problem of litter control may be even more severe, because the animal may simply jump out of the box, throwing litter around the container. However it occurs, this scattered litter causes pet owners to spend more time cleaning than is generally desired. Prior attempts to keep the litter from being thrown or tracked out of the litter box, or to knock the litter off of the animal upon egress, include grates placed to one side of the litter box, as are illustrated in U.S. Pat. Nos. 5,195,464, 5,218,930, 5,220,886, and 5,361,725. These designs do not sufficiently control the animal to ensure that it travels over the desired path. Multilevel boxes that require the animal to jump up several levels to leave the box, as shown in U.S. Pat. No. 5,092,277, are only accessable to healthy, adult animals.

In litter boxes presently available, odor control is also a problem. Known efforts at control include placing the litter box in an area not commonly used by the pet owner, e.g., a back hallway, or use of scented or deodorizing litter.

Known litter boxes commonly have relatively high sides to aid in litter containment. However, as owners of young and old cats can attest, access to such a box can be difficult for these animals. When an animal is not completely healthy, it may also have difficulty gaining access to a box of this type. Accordingly, it is an object of the invention to provide a litter box that is easily accessed by animals of all ages and states of health.

It is another object of the invention to provide a litter containment apparatus in which scattering of litter is reduced or prevented.

It is a still further object of the invention to provide a waste containment system that is easily cleaned and maintained, and has improved odor control.

It is an object of the invention to provide improved elements and arrangements thereof in an apparatus for the purposes described, which is inexpensive, dependable, and fully effective in accomplishing its intended purposes. These and other objects of the present invention will become readily apparent from the following specification and drawings.

SUMMARY OF THE INVENTION

The present invention relates to a pet waste containment system, or litter box, that is easily accessed by animals of all ages, and that provides for improved litter containment, maintenance, and odor control.

In one embodiment, the waste containment system includes a base, accessed by a ramp, and is constructed so that the animal travels a selected pathway in the base to and from the litter area itself. By requiring the animal to step through this selected passageway, and down the ramp, litter is dislodged from the animal's feet and fur and collected so that it is not tracked throughout the house. The ramp is undulating, and may have slots or indentations for collecting litter particles. The undulations and slots serve to dislodge and collect the litter particles from the cat's feet and fur. The undulations also exercise the muscles of the animal's feet and legs, and the gradual incline of the ramp makes access possible for animals of any age or state of health.

To insure that the animal does not simply jump out of the box but follows the selected pathway, the waste containment system is preferably covered. The cover may be constructed of any suitable material, including plastic and fabric. Most preferably, the cover is domed and interfits with the base. The cover may be detachable from the base, and at least partially covers the ramp to insure that the animal travels over the ramp after leaving the litter container. The cover is preferably securely fastened to the base of the waste containment system to aid in odor control, and to insure that the animal follows the prescribed pathway for entering and departing the litter box. The ramp itself is of a sufficiently gradual angle between the floor and base to allow pets of all ages and states of health to access the box, and is undulating to encourage exercise of the animal's feet. Moreover, the ramp preferably includes indentations, slots, or holes near each undulation so that litter is dislodged from the animal's feet and collected. The ramp may be integral with the base or removable, and is preferably pivotable so that the litter particles that fall through the slits or holes may be removed from the base. An optional collection tray located beneath the ramp also aids cleaning and maintenance.

The litter container or tray is easily accessed, and is preferably removable, for cleaning and maintenance. In one embodiment, the litter container swings or pivots away from the waste containment system to allow access. In an alternative embodiment, the litter container slides out of the waste containment system. The litter container may also be fully detachable. Additional features to aid in cleaning and maintenance include a pour spout in the litter container itself, and a urine deflection system to reduce or prevent leaks, and to control odors.

In a second embodiment of the invention, the litter container is accessed directly by the undulating ramp. In this embodiment, the system is preferably covered. The cover may be semitransparent, allowing the owner to discern whether the cat is in the box, and is preferably constructed of fabric. In this embodiment, the waste containment system is substantially unitary, and includes a pour spout and tool storage, as well as a trap door to aid in pouring out the used litter and for retaining the litter in the box prior to removal. The container may also be used with a liner, which also simplifies cleaning.

In this embodiment, the ramp may be unitary with the base or removable, although a removable, pivotable ramp is preferred. Where the ramp is pivotable, the litter box can simply be picked up and aimed into a disposal container when a complete change of litter is desired. The ramp pivots out of the way, and the litter and solid waste are dumped through the spout for disposal.

DETAILED DESCRIPTION

As shown in the various FIGURES, wherein corresponding parts bear corresponding reference numerals, the pet waste containment system, or litter box, of the present invention has an inclined access into the litter container, and the litter container is preferably covered.

Figure 1:
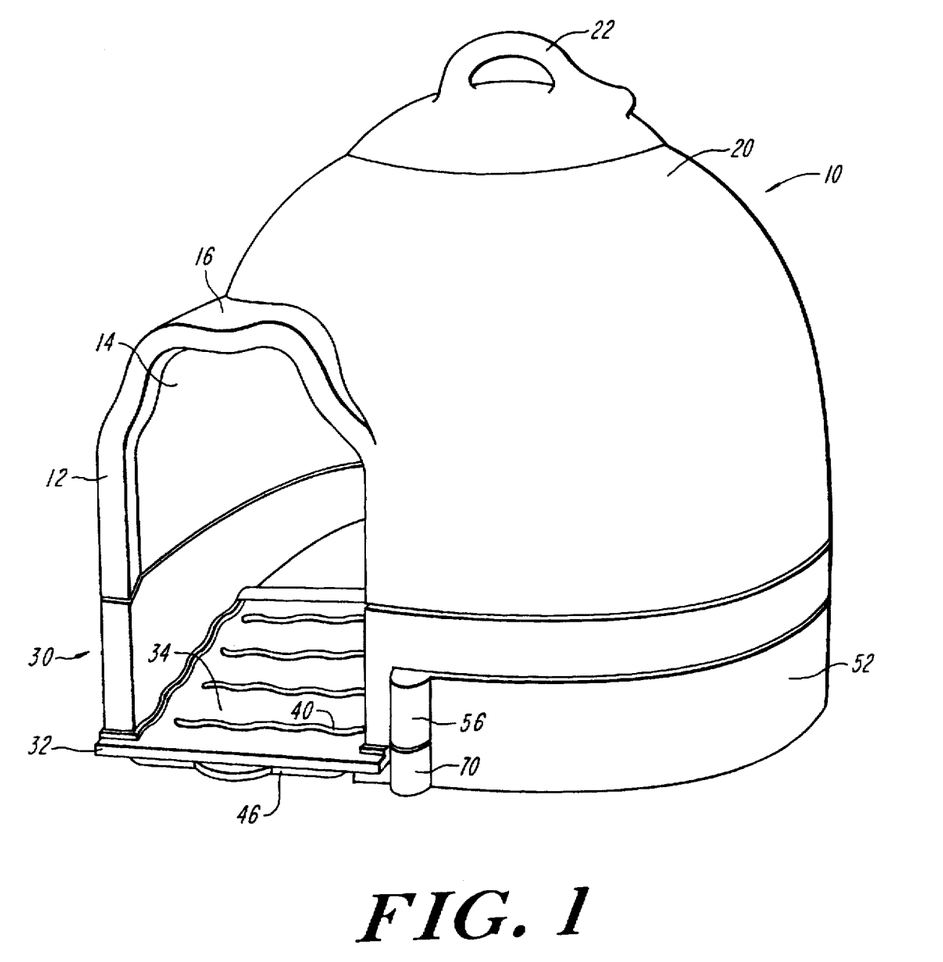
FIG. 1 is a perspective view of the front and right side of one embodiment of the Pet Waste Containment System illustrating the entrance, ramp, and top.

FIG. 1 illustrates a waste containment system 10 according to one embodiment of the present invention, having a base 30, and, preferably, a top 20. The embodiment shown in FIGS. 1–5 is rounded; however, as shown in FIGS. 6–10, waste containment systems of other shapes, including square and rectangular, are also within the scope of the invention. Top 20 has at least one wall 12, defining an entrance opening 14. As is shown in FIG. 1, top 20 may include a handle 22. Secure attachment of top 20 to base 30 may be aided by one or more latches (not shown) as are known in the art.

As shown in FIG. 1, base 30 may be equipped with ramp 32 having a gradual incline that rises from approximately ground or floor level to approximately the level of passage 48 in base 30. Ramp 32 may be replaced with at least one step, not shown, or other known structures for ensuring gradual access. Ramp 32 includes at least one undulation 34. Although FIG. 1 illustrates undulation 34 running substantially horizontal to the length of ramp 32, other configurations, including individual hill-like undulations and one or more diagonal or lengthwise undulations, are also contemplated. Entrance opening 14 preferably includes a roof portion 16 that at least partially covers ramp 32 to encourage the animal to exit waste containment system 10 by traveling across ramp 32. Ramp 32 also includes litter collecting elements 40 in the form of slits, holes, or concavities. As an animal travels down ramp 32, undulations 34 exercise the muscles of an animal's feet and legs while dislodging the litter particles from between its foot pads or toes. Litter collecting elements 40 prevent individual particles from accumulating on the surface of ramp 32 so that they are not tracked out of waste containment system 10. The gradual incline of ramp 32 makes access and egress easy for animals of any age or state of health.

Figure 2:
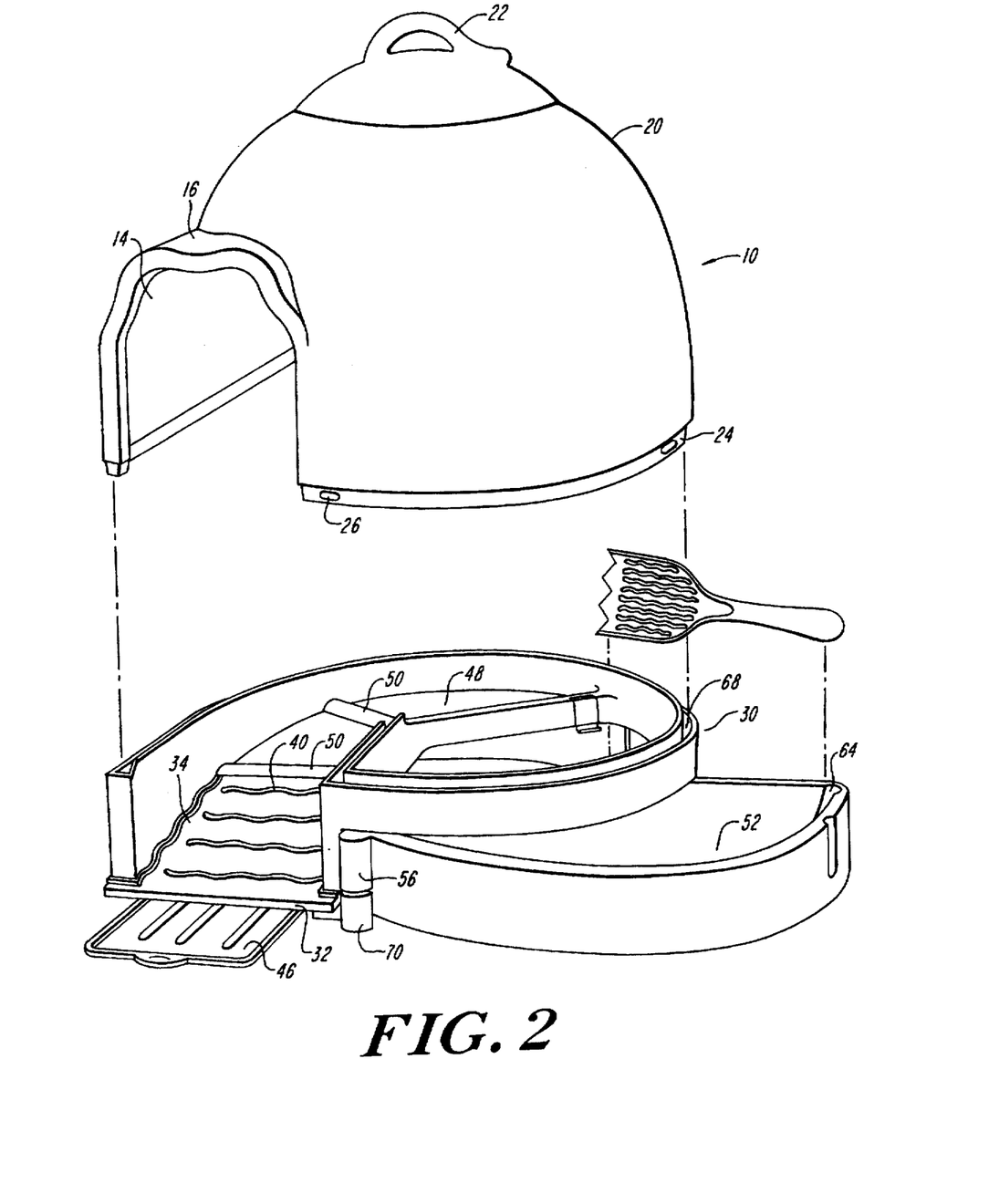
FIG. 2 is an exploded plan view of one embodiment of the invention illustrating a domed top, ramp, and the litter container.
Figure 9:
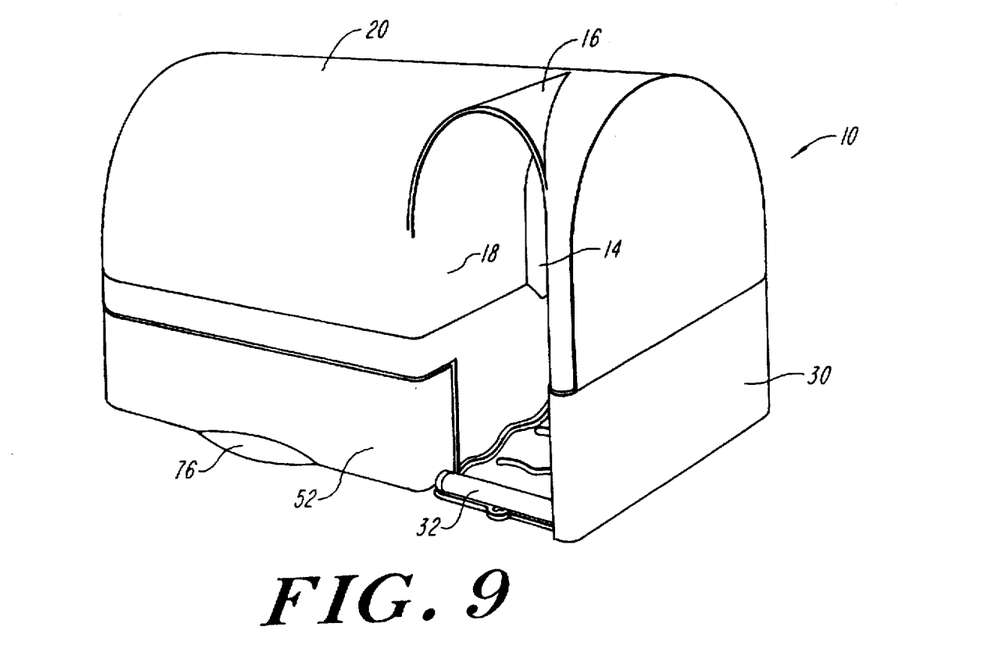
FIG. 9 is a perspective view of a second alternative embodiment of the present invention.

As illustrated in FIGS. 1, 2, and 9, after traveling up ramp 32, the animal is directed into litter container 52 by walls 74 of base 30, and, if used, wall 12 of top 20. The animal may be prevented from traveling directly from litter container 52 over ramp 32 by at least one inner wall 18 in top 20 or in base 30, so that it must pass through passage 48 when entering and leaving litter container 52. Raised portions 50 in passage 48 retain dislodged litter in that passage, preventing it from rolling down ramp 32. To provide additional insurance that the animal does not exit waste containment system 10 by simply jumping out of litter container 52, litter container 52, is preferably covered by top 20. Most preferably, top 20 covers the majority of waste containment system 10 and is domed.

Figure 3:
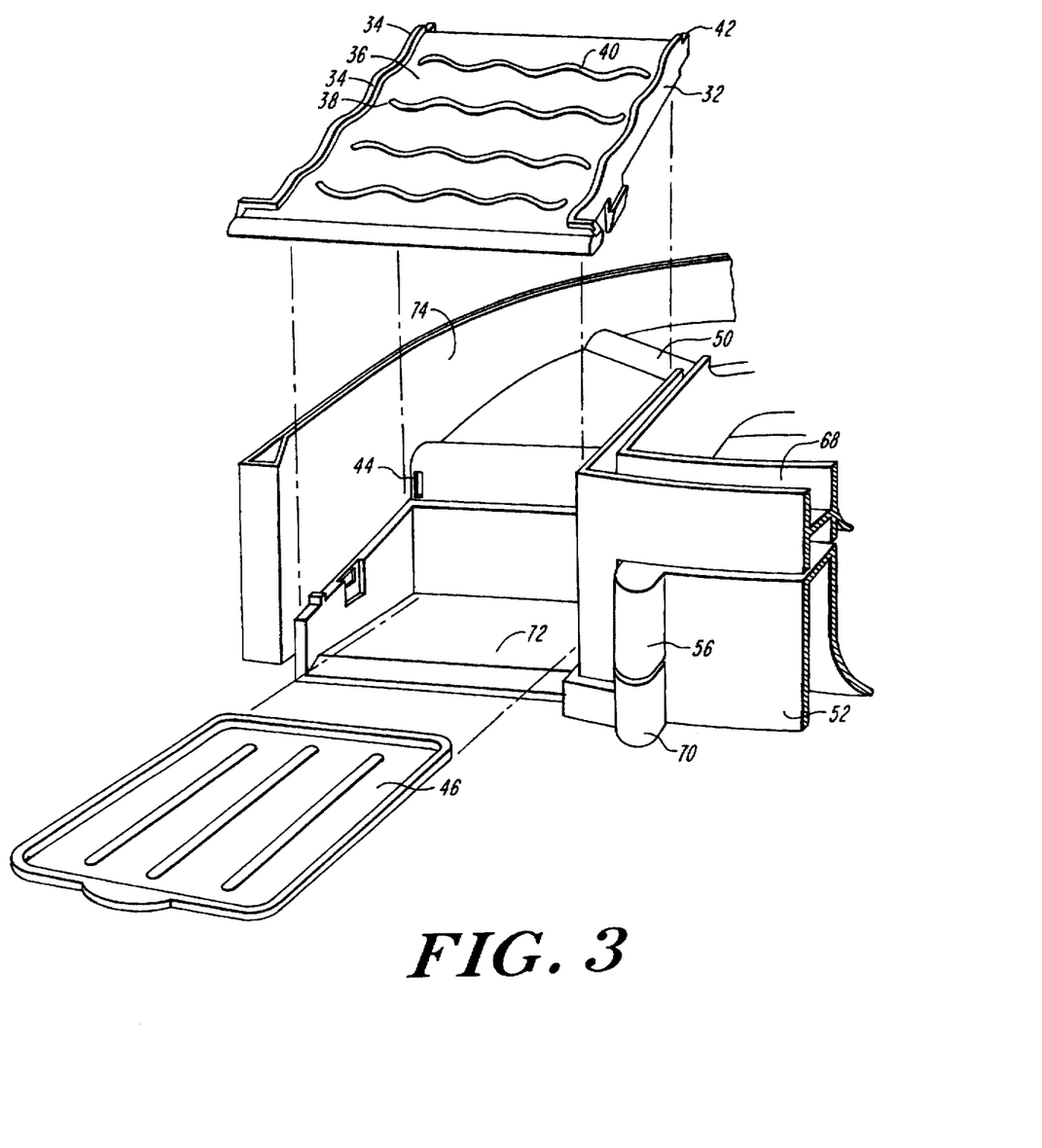
FIG. 3 is an exploded cross-sectional front view along line 3—3 showing the undulating ramp and litter collecting tray.
Figure 7:
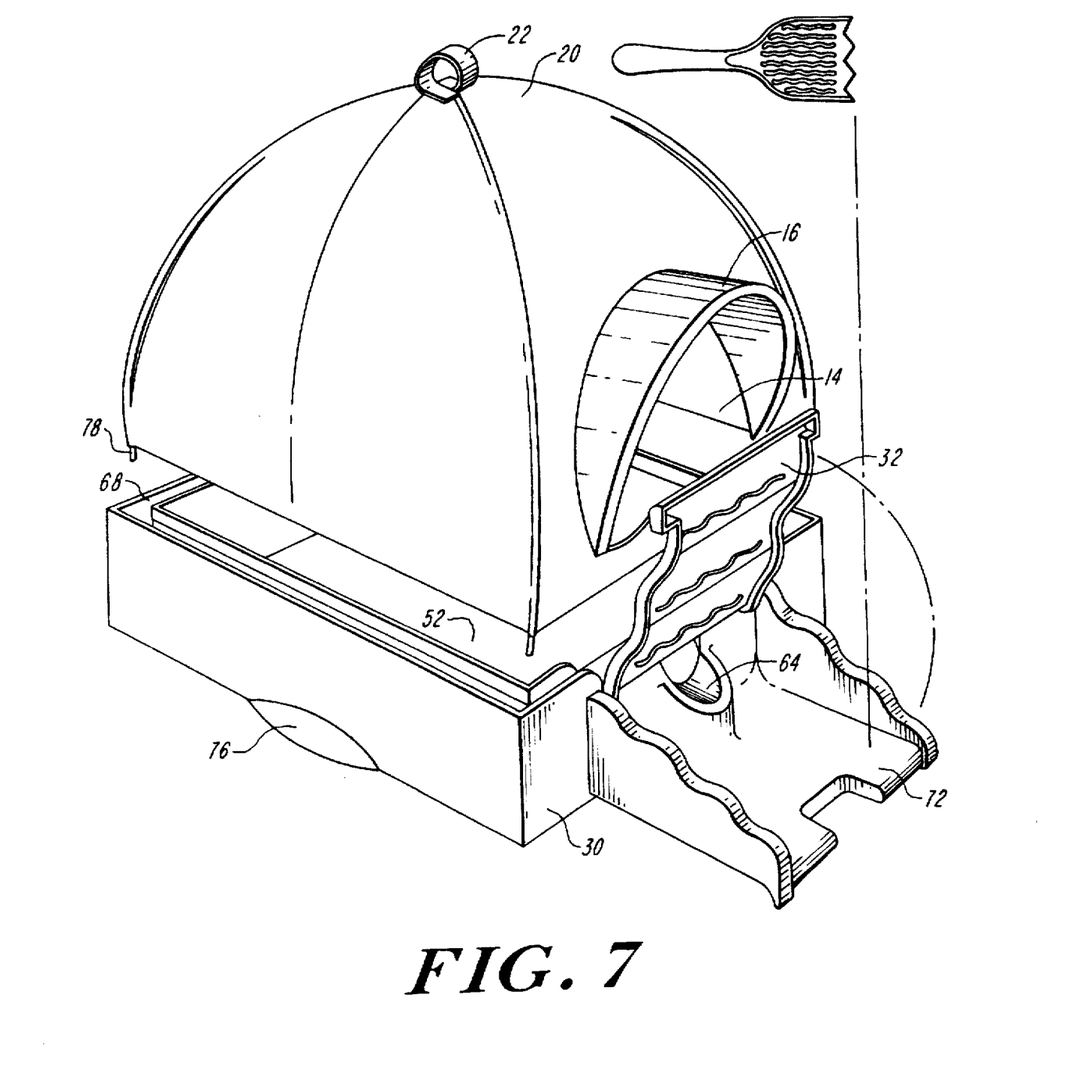
FIG. 7 is an exploded plan view of the embodiment of FIG. 6.

Ramp 32 may be unitary with base 30 or may be detachable. As illustrated in FIG. 3 and FIG. 7, ramp 32 may be detachably interfit with base 30 by means known in the art, there illustrated by the insertion of tab 42 in slot 44. Where litter collecting means 40 includes slits or holes, tray 46 is preferably positioned beneath ramp 32 to aid cleaning and containment, as opposed to allowing the litter to collect on floor 72 or to collect on the surface beneath waste containment system 10. Tray 46 is preferably slidably removable from beneath ramp 32 in base 30.

To provide improved odor control, top 20 interfits securely with base 30. As shown in FIG. 2, top 20 may further include securing rim 24, and locking tabs 26. Securing rim 24 seats snugly in groove 68 in base 30, and is further held in place by the friction of locking tabs 26. Inner wall 18 acts as a baffle, for keeping odors from escaping litter container 52.

Figure 4:
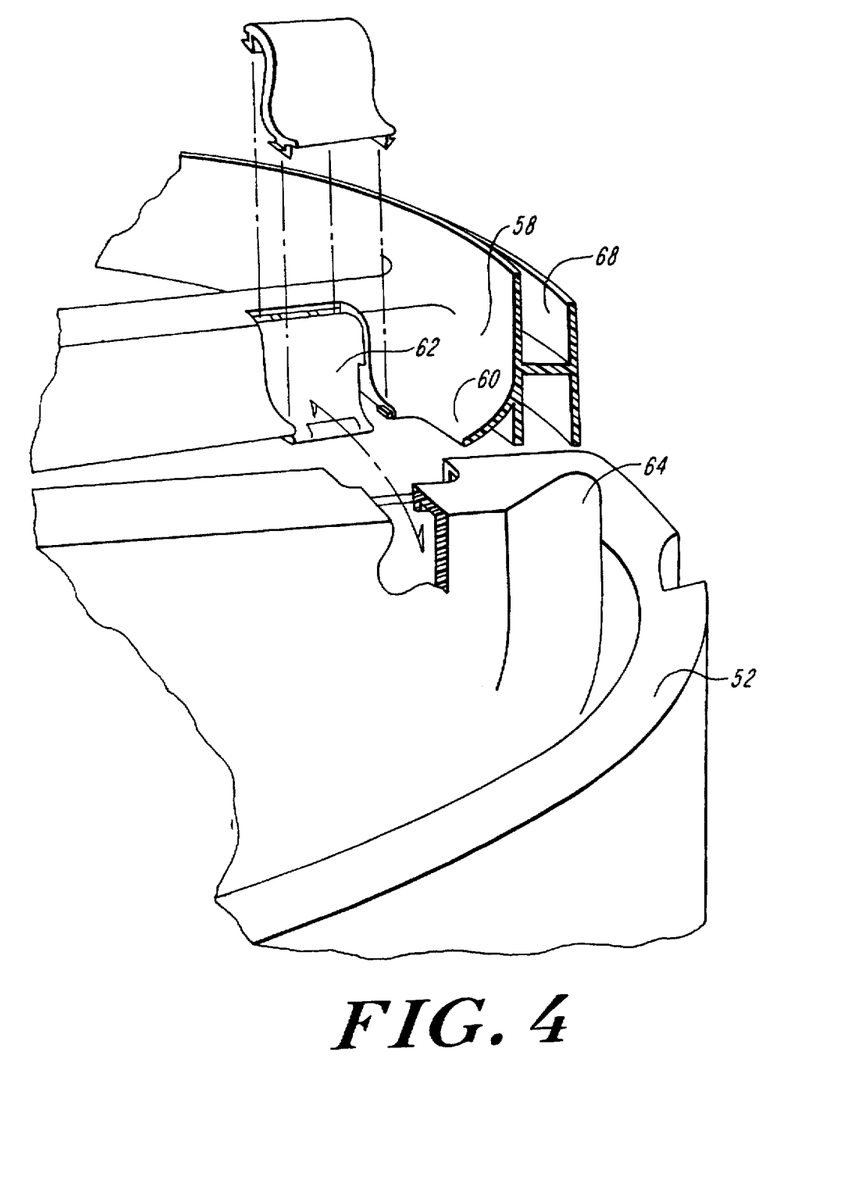
FIG. 4 is an exploded, fragmentary sectional view of one portion of the litter container, taken along line 4—4.
Figure 5:
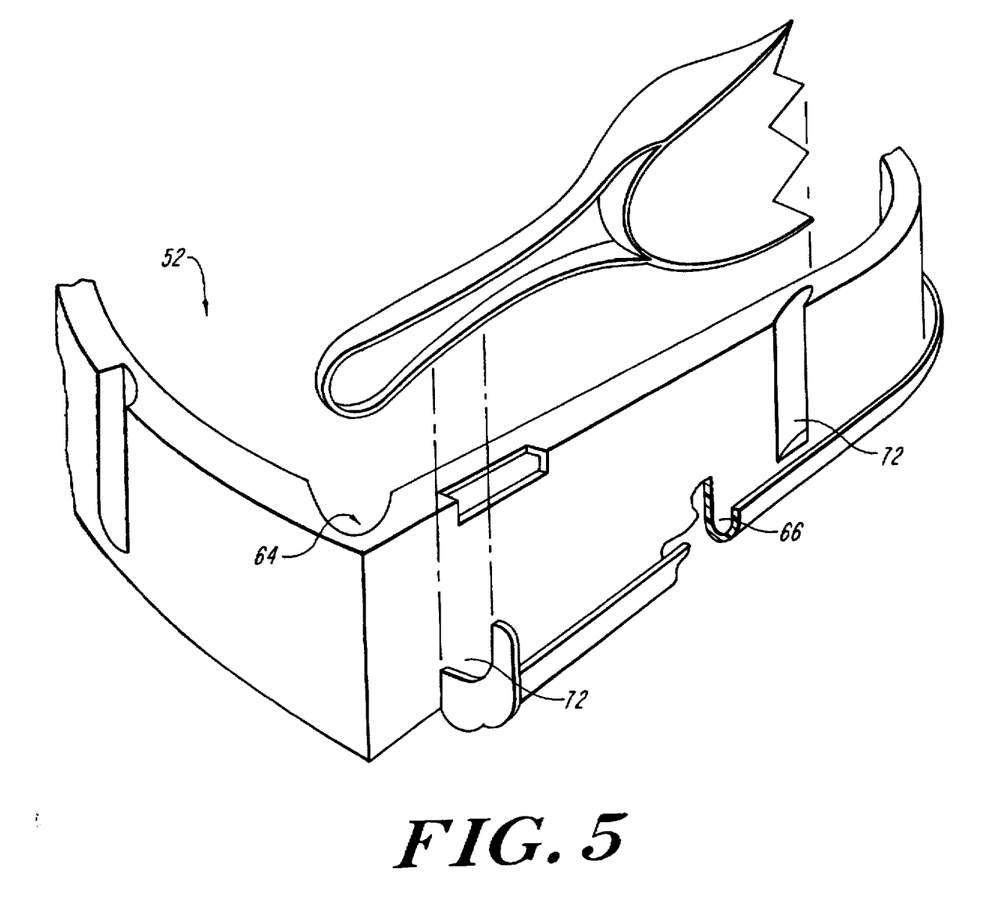
FIG. 5 is an end view of the litter container of FIG. 1, with portions broken away, showing the pour spout, the optional tool retaining elements, and the urine drip catch channel.

Additional sanitary and odor control features of the embodiment are illustrated in FIGS. 4 and 5, including urine spray deflector 58, drip director 60, and drip catch channel 66. These elements direct urine droplets into litter container 52 and prevent drips from leaking out of waste containment system 10. Drops of urine are primarily directed back into litter container 52 by deflector 58. Drops thrown up under deflector 58 are directed back into litter container 52 by drip director 60. Drip catch channel 66 projects from at least one side of litter container 52, and catches any drips not directed back into litter container 52, preventing urine from contacting and damaging the surface on which waste containment system 10 is placed.

Figure 10:
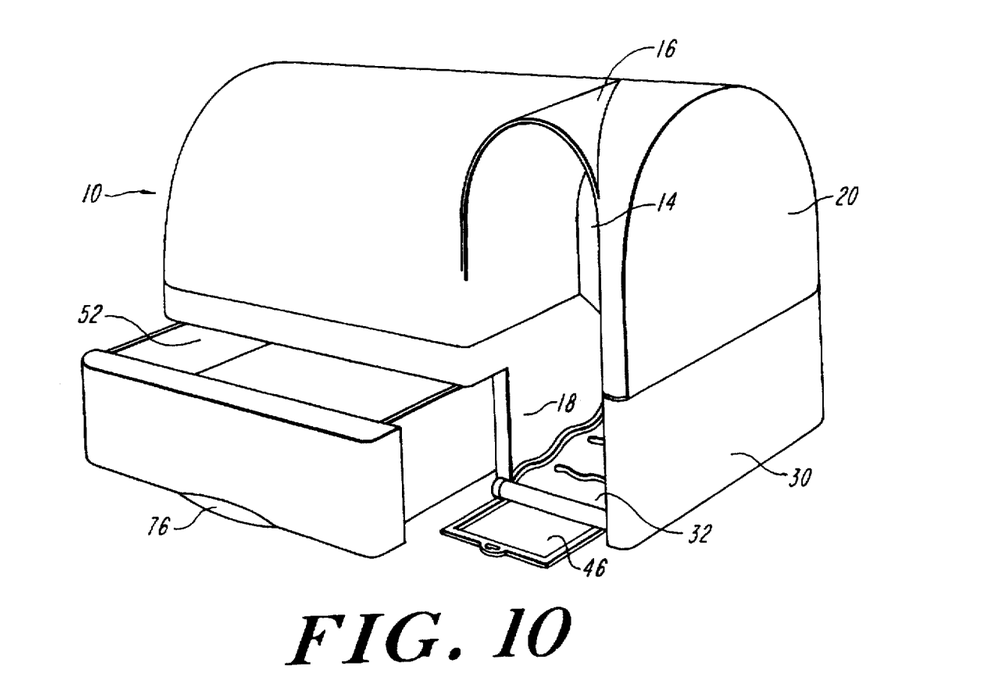
FIG. 10 is a perspective view of the embodiment shown in FIG. 9, showing access to the litter container and litter collecting tray.

Litter container 52 may be provided with pivot element 56 for easy access and cleaning. Inadvertent pivoting can be prevented by latch 62, or by other means known in the art. First pivot element 56 interfits with second pivot element 70 on base 30, and is preferably detachable, for ease in changing the litter. Alternatively, litter container 52 may slide out from base 30, as is shown in FIG. 10. When complete cleaning or litter change is desired, litter container 52 is disengaged from base 30, and pour spout 64 is directed into a waste container. Waste containment system 10 may also include tool or scoop securing elements 72, one example of which is illustrated in FIG. 5.

Figure 6:
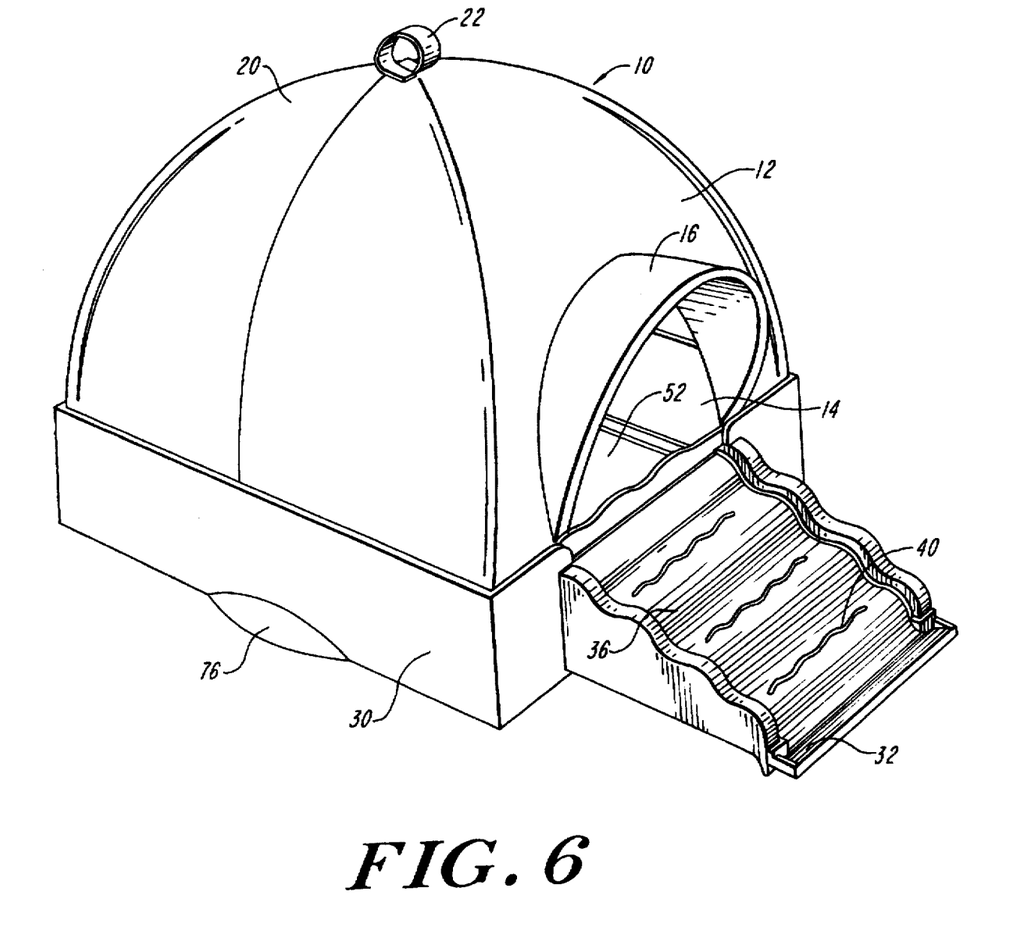
FIG. 6 is a perspective view of an alternative embodiment of the present invention.
Figure 8A:
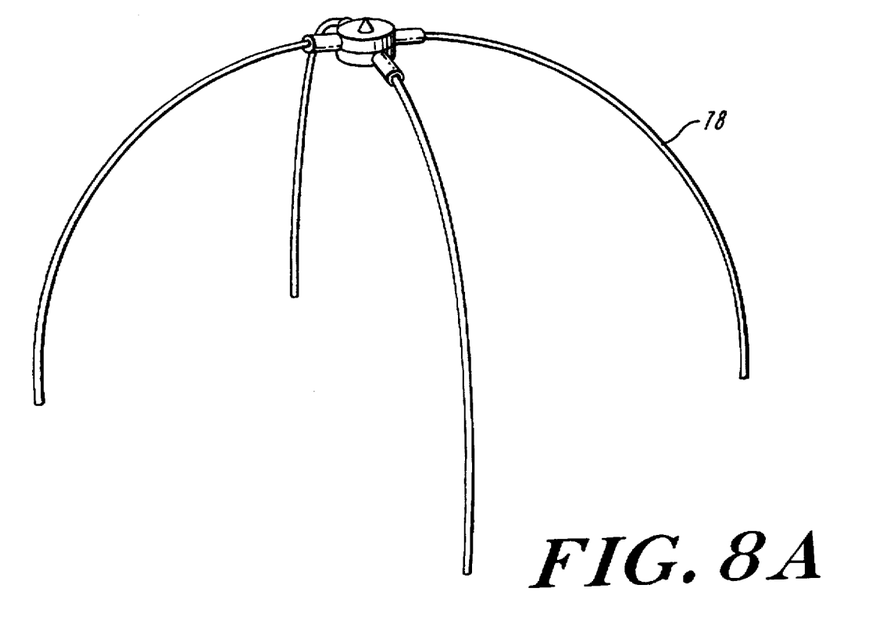
FIG. 8A and 8B illustrate one mechanism for supporting a fabric top as shown in FIG. 7.
Figure 8B:
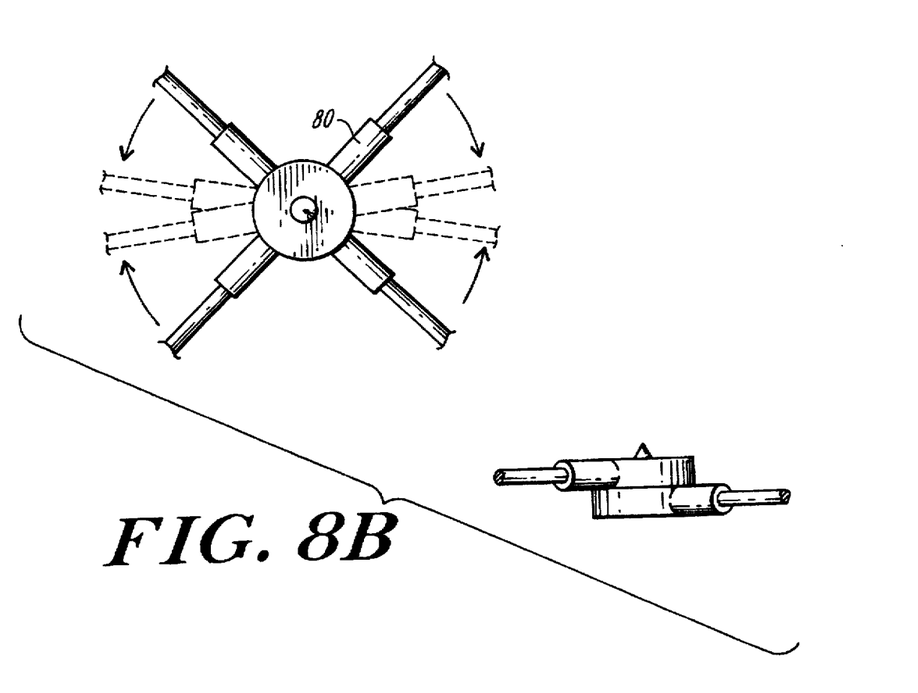

In the embodiment illustrated in FIGS. 6–8, waste containment system 10 is shown as generally square or rectangular and is equipped with ramp 32 having undulations 34 and litter collection elements 40. In the embodiment shown in these figures, top 20 may be made of fabric, and it has an entrance 14 including roof portion 16 that projects over ramp 32 to guide the animal over undulations 34. Top 20 may be semitransparent, which allows the owner to discern whether or not its pet is in the box. Top 20 is also fitted with handle 22 for removal and may be collapsible when removed.

As illustrated in FIG. 7, ramp 32 interfits with base 30. Floor 72 serves to store a maintenance or cleaning tool and to direct the litter into a waste receptacle for cleaning. Cleaning of this embodiment is easily accomplished. First, top 20 is removed by handle 22. Then, base 30 is lifted using handles 76, and floor 72 is aimed into a waste container. Ramp 32 pivots out of the way, and litter from litter container 52 passes through pour spout 64, over floor 72, and into a waste receptacle. Alternatively, litter container 52 may be fitted with a liner, which is simply picked up and thrown away.

FIGS. 8A and 8B illustrate one means for providing support for a fabric top 20. Support may be provided by poles 78 secured by spider support 80. Additional support for top 20 is provided when poles 78 are inserted in groove 68 in base 30, as shown in FIG. 7.

In a second alternative embodiment shown in FIGS. 9 and 10, where waste containment system 10 is rectangular, entrance 14 is located to one side. Thus, the animal is encouraged to travel over a selected pathway 48 prior to departing waste containment system 10, preventing dispersal of the litter particles. FIG. 10 illustrates slidable litter container 52.

It will thus be seen that the objects set forth above, including those made apparent from the preceding description, are efficiently attained. Since certain changes may be made in the article of the invention without departing from the scope of the invention, it is intended that all matter contained in the above description or shown in the accompanying drawings be interpreted as illustrative and not limiting. The following claims are intended to cover all of the generic and specific features of the invention herein described, and all equivalents thereto.

Having described the invention, what is claimed as new and secured by Letters Patent is:

1. A waste containment system for an animal, said system comprising:
    base having at least one directing wall means;
    litter containment means engaged with said base; and
    inclined access means couplable to said base for allowing an animal to access said litter containment means, said inclined access means including litter dislodging means and dislodged litter retention means.

2. The waste containment system of claim 1 wherein said inclined access means is selected from the group consisting of a ramp and a step.

3. The waste containment system of claim 1 wherein said litter dislodging means includes an undulation.

4. The waste containment system of claim 1 wherein said litter collection means is selected from the group consisting of a recess in said access means and an opening through said access means.

5. The litter collection means of claim 1 further comprising litter retention means arranged beneath said access means.

6. The waste containment system of claim 1 further comprising cover means having an outer wall defining an entrance opening.

7. The waste containment system of claim 6 wherein said cover means is domed.

8. The waste containment system of claim 6 wherein said cover means further comprises roof means projecting over said entrance opening.

9. The waste containment system of claims 6 wherein said cover means further comprises means for directing the animal along a selected pathway in said base between said access means and said litter containment means.

10. The cover means of claim 9 wherein said means for directing comprises a first inner wall arranged substantially adjacent said inclined access means, wherein said first inner wall prevents an animal from directly accessing the litter container from said inclined access means.

11. The waste containment system of claim 1 wherein said directing wall means further comprises means for directing the animal along a selected pathway across said base between said access means and said litter containment means.

12. The waste containment system of claim 11 wherein said directing wall means comprises a first inner wall in said base means and adjacent said access means, wherein said inner wall is arranged to prevent the animal from directly accessing said litter containment means from said inclined access means.

13. The waste containment system of claim 1 wherein said litter containment means is removably and replaceably engaged with said base.

14. The waste containment system of claim 1 wherein said litter containment means is slidably engagable with said base.

15. The waste containment system of claim 1 wherein said base further comprises urine deflection means adjacent said litter containment mean.

16. A waste containment system for an animal, said system comprising:
    a base having at least one side wall and a litter containment means;
    and inclined access means couplable to said base for allowing an animal to access said litter containment means, said inclined access means having an undulation and including litter dislodging means and dislodged litter retention means;
    and a cover.

17. The waste containment system of claim 16 wherein said inclined access means is selected from the group consisting of a ramp and a step.

18. The waste containment system of claim 16 herein said litter collection means is selected from the group consisting of a recess in said access means and an opening through said access means.

19. The litter collection means of claim 16 further comprising litter retention means arranged beneath said access means.

20. The waste containment system of claim 16 further comprising cover means having an outer wall defining an entrance opening.

21. The waste containment system of claim 20 wherein said cover means is domed.

22. The waste containment system of claim 20 wherein said cover means further comprises roof means projecting over said entrance opening.

23. The waste containment system of claim 16, said base further comprising pour spout means.

24. A waste containment system for an animal, said system comprising:
    base having at least one directing wall means;
    litter containment means pivotally engaged with said base; and
    inclined access means couplable to said base for allowing an animal to access said litter containment means, said inclined access means including litter dislodging means.

25. A waste containment system for an animal, said system comprising:
    base having at least one directing wall means;
    litter containment means engaged with said base, said litter containment means including a drip catch means; and
    inclined access means couplable to said base for allowing an animal to access said litter containment means, said inclined access means including litter dislodging means.

* * * * *

UNITED STATES PATENT AND TRADEMARK OFFICE
CERTIFICATE OF CORRECTION

PATENT NO. : 5,713,302  
DATED : February 3, 1998  
INVENTOR(S) : Glen V. Walter et al.

Page 1 of 1

It is certified that error appears in the above-identified patent and that said Letters Patent is hereby corrected as shown below:

Title page,
Item [63], Related U.S. Application Data, delete "Feb. 2, 1995" and insert -- Feb. 16, 1995 --.

Column 1,
Line 5, delete "Feb. 2, 1995" and insert -- Feb. 16, 1995 --.

Signed and Sealed this

Eighteenth Day of October, 2005

JON W. DUDAS
*Director of the United States Patent and Trademark Office*